June 15, 1937.  A. S. HAISLIP  2,084,251
FISHING LINE DRIER
Filed Sept. 1, 1936
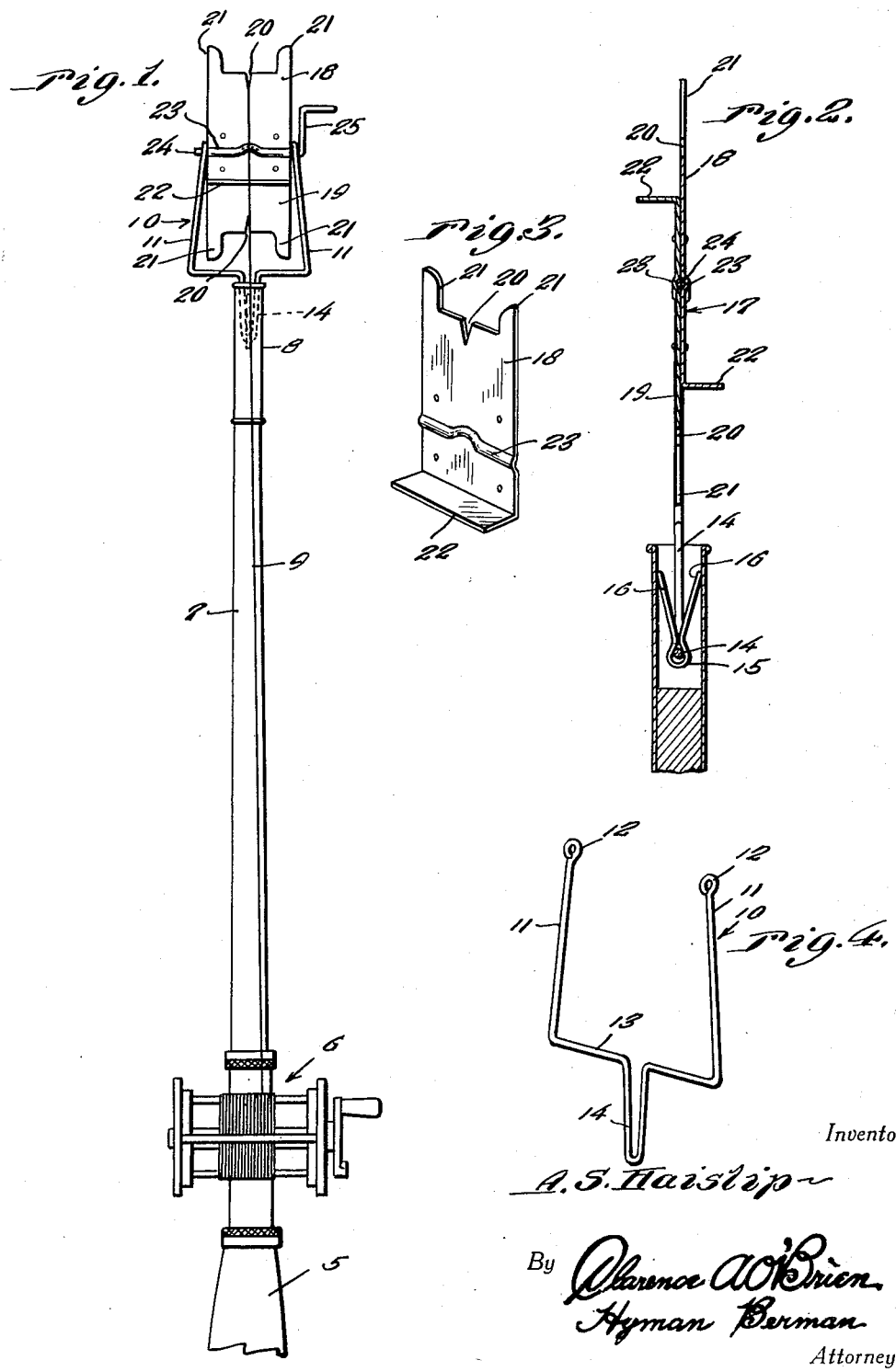
Inventor
A. S. Haislip
By Clarence A. O'Brien
Hyman Berman
Attorneys Patented June 15, 1937

2,084,251

UNITED STATES PATENT OFFICE 2,084,251

FISHING LINE DRIER

Albert S. Haislip, Fredericksburg, Va.

Application September 1, 1936, Serial No. 98,961

6 Claims. (Cl. 242—84.1)

The present invention relates to an ingenious article of equipment constituting a handy and satisfactory accessory susceptible of being carried in a fisherman's kit to facilitate drying a wet fishing line.

It is a matter of common knowledge that fishermen resort to all sorts of makeshift devices and crude structures to facilitate drying a wet line and prevent it from rotting or deteriorating too rapidly. I have therefore discovered the need for a simple and efficient hand-actuated reel to facilitate handling and drying a wet line. I am sufficiently conversant with the state of the art, however, to realize that a line-drying reel is not broadly new.

In reducing to practice the preferred embodiment of the instant invention, I have perfected what may be described as an attachment susceptible of application to an existing socket at the outer end of a fishing rod, the arrangement being such as to enable said drying reel to be employed in conjunction with the line reeling and winding reel to permit the desired result to be accomplished more expeditiously and satisfactorily.

To state the nature of the invention otherwise, I have perfected a simple and economical line-drying reel which can be temporarily and detachably connected to the existing socket on the pole or rod in alinement with the regular hand reel so that the free end of the line can be attached to the drying reel and wound thereon, after which it may be returned to the fishing reel in a convenient and feasible manner.

Manifestly, it is my primary aim to generally improve upon accessories of this type by providing a structure characterized by a selection and coordination of practicable features, one of which is the double plate-like reel, and the other the holding yoke therefor, said yoke being provided with a special retention element whereby it may be frictionally and detachably held in the existing or stock socket on the fishing rod in a reliable manner.

Other features and advantages will become more readily apparent from the following description and drawing.

In the drawing:

Figure 1 is an elevational view showing a fragmentary portion of a rod and reel illustrating the line-drying reel temporarily applied thereto in an obviously usable manner.

Figure 2 is an enlarged longitudinal sectional view through the features depicted in Figure 1.

Figure 3 is a perspective drawing of one of the plate members of the line-winding and drying reel.

Figure 4 is a perspective view of the adjustable resilient reel adapter yoke.

In the drawing in Figure 1, the handle of the regulation or standard fishing rod is denoted by the numeral 5 and the fishing line reel is indicated at 6. On the outer end of the rod 7, which may be of sections or otherwise, is a ferrule coupling which is here conveniently denoted as an accommodation socket for the line-drying attachment. Incidentally, the fishing line is indicated by the numeral 9.

One part of the attachment comprises a wire yoke of the type shown in Figure 4 and denoted by the numeral 10. This is formed from a single length of wire bent between its ends to define a pair of adjustable, that is, spreadable arms 11 and these terminate in bearing-forming eyes 12. The bight or connecting portion 13 of the yoke is bent into a substantially V-shaped insert 14 which is adapted to be inserted into the so-called socket 8 in the manner shown in dotted lines in Figure 1 and full lines in Figure 2. Although other ways may be employed to retain the adapter extension 14 in place, I have found it expedient and practicable to use a simple clip. This comprises a coil spring 15 which embraces the crotch portion of the V-shaped extension, and a pair of outstanding or diverging retaining fingers or prongs 16. These features 16 in conjunction with the adapter extension 14 serve to removably and adjustably attach the yoke 10 to the socket 8. That is to say, the device can be shoved in or pulled out from the socket in an obvious manner, and the arrangement is such as to fit different sized sockets. It might be stated in passing that other means may be employed to adjustably and detachably connect the yoke 10 to the rod 7.

The reel unit per se is denoted by the numeral 17 and is adaptable for conveniently winding and drying the line in an obvious manner. It is preferably made up of a pair of duplicate companion, substantially rectangular flat metal plates 18 and 19. At one end each plate is formed with a V-shaped line-receiving notch 20 and guard ears or lugs 21. At the opposite end there is an outstanding flange 22 over which the line passes to hold the line in spaced relation from the main or body portion for complete ventilation and drying. The two plates are riveted or otherwise fastened together in superposed relation and their overlapping portions are provided with outwardly struck beads and the opposed beads serve to accommodate the shaft portion 24 of the crank shaft. The hand crank is denoted by the numeral 25. In other words, the two plates are fastened together around the shaft and the shaft is mounted for rotation in the bearing 12 with the crank 25 accessible to conveniently turn the body of the reel. The free end of the line is simply placed in the notches and wound around by hand a couple of turns. Then the hand crank is grasped and the reel 17 is spun so as to wind the line off of the fishing reel 6 and onto the drying reel 17.

Obviously, by mounting the drying wheel in longitudinal alinement with the already existing fishing reel 6, this enables the line to be wound from the reel 6 onto the reel 17 and then after it is dried it may be wound back onto the reel 6 in a convenient and expeditious manner. It would appear therefore that novelty resides in the combination of the drying wheel with the rod and reel, and especially in the construction of the drying wheel itself.

The latter part appears to be novel in that it comprises a yoke having means whereby it may be conveniently and detachably connected with an existing feature 8 on the regular rod 7. In addition to this is the flat plate-like drying reel unit 17 rotatably mounted between the arms of the yoke, the arms being properly bendable to permit the reel 17 to be removed or replaced as desired. Specific novelty resides in the reel unit 17 comprising the superimposed riveted plate with the oppositely outstanding drying fins or flanges 22. In addition to this emphasis is attached to the extension 14 on the yoke and the friction resilient prongs 17 cooperable therewith to facilitate proper maintenance of the drying reel in the coupling or socket 8.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An attachment of the class described comprising a substantially U-shaped yoke having on its bight portion a V-shaped adapter extension, a spring double-pronged retention clip connected with said extension, a crank shaft mounted for rotation on the arms of the yoke, and a reel mounted on said crank shaft between said arms.

2. An attachment of the class described comprising a yoke having means for detachable connection with a fishing line rod, a crank shaft mounted for rotation in said yoke, a reel mounted on said crank shaft, said reel including a pair of superimposed plates fastened together, said plates having line accommodation and guard means at their respective outer ends, the inner end portions thereof being provided with outstanding flanges in the manner and for the purpose described.

3. An attachment of the class described comprising a yoke the bight portion of which is provided with a substantially V-shaped adapter element designed to extend into a socket, a double pronged spring clip connected with the crotch portion of said adapter element and designed to cooperate with the walls of the socket to maintain the adapter removably in place, a crank shaft mounted for rotation on the arm portions of said yoke, a reel mounted on said shaft between the yoke arms, said reel embodying a substantially flat rectangular plate having line accommodation means at opposite ends, and said plate being provided on opposite sides with laterally projecting line spacing and reeling lugs to facilitate ventilation and expeditious drying of the line.

4. As a component part of a fishing rod reel attachment of the class described, a yoke formed from a single length of wire bent between its ends to define a substantially U-shaped portion, the connective bight portion of said yoke being bent to define a substantially V-shaped extension, and a multiple prong spring retention clip attached to said extension to facilitate holding the extension releasably in an associated socket.

5. As a component part of a line drying reel of the class described, a reeling unit comprising a substantially flat plate structure having line accommodation and keeper notches at opposite ends thereof, and being provided adjacent its central portion on opposite sides with lateral outstanding lugs constituting line spacing and ventilating members.

6. As a new product of manufacture, a tackle box type fishing line drier adapted for temporary quick detachable connection with a conventional rod and reel assembly and susceptible of being carried in the tackle box with the line wound thereon for convenient drying purposes comprising a substantially U-shaped yoke having retention means on its bight portion for quick releasable engagement with an existing part of the aforementioned rod, and a line winding and drying reel supported rotatably between the free ends of the arms of said yoke, said reel having an operating handle and including a flat plate body portion constructed at opposite ends to facilitate winding and unwinding of the line, and said plate being provided on opposite sides adjacent its central portion with relatively short outstanding line spacing flanges, whereby when the plate is in a plane with the arms of the yoke, a compact and convenient assemblage is thus provided.

ALBERT S. HAISLIP.